United States Patent [19]

Fine

[11] Patent Number: 4,903,314
[45] Date of Patent: Feb. 20, 1990

[54] SINGLE PLATE COMPACT OPTICAL CORRELATOR

[75] Inventor: John V. Fine, Goose Creek, S.C.

[73] Assignee: Grumman Aerospace Corporation, Bethpage, N.Y.

[21] Appl. No.: 200,600

[22] Filed: May 31, 1988

[51] Int. Cl.$^4$ .......................... G06K 9/64; G03H 1/02
[52] U.S. Cl. ....................................... 382/31; 350/3.6; 350/162.13; 382/42
[58] Field of Search .................. 382/31, 42; 350/3.61, 350/3.6, 3.67, 3.68, 3.82, 162.13, 318, 321, 3.7, 3.72, 3.73; 364/822; 365/125

[56] References Cited

U.S. PATENT DOCUMENTS

| | | |
|---|---|---|
| 3,427,586 | 2/1969 | Lohmann . |
| 3,492,469 | 1/1970 | Silverman . |
| 3,624,605 | 11/1971 | Aagard . |
| 3,636,512 | 1/1972 | Edwards ............................. 383/31 |
| 3,669,521 | 6/1972 | Tait . |
| 3,756,907 | 10/1973 | Williams . |
| 3,773,401 | 11/1973 | Douklias et al. . |
| 3,779,492 | 12/1973 | Grumet . |
| 3,785,736 | 1/1974 | Spitz et al. . |
| 4,277,137 | 7/1981 | Upatnieks et al. . |
| 4,383,734 | 5/1983 | Huignard et al. . |
| 4,394,063 | 7/1983 | Weiss et al. . |
| 4,468,085 | 8/1984 | Hutcheson et al. ............ 350/162.13 |
| 4,490,849 | 12/1984 | Grumet et al. . |

OTHER PUBLICATIONS

Aerial reconnaissance film screening using optical matched-filter image-correlator technology, Applied Optics, vol. 17, p. 2892, Sep. 15, 1978.
Real-time screen-aided multiple-image optical holographic matched-filter correlator, Applied Optics, vol. 21, p. 3278, Sep. 15, 1982.

*Primary Examiner*—Leo H. Boudreau
*Assistant Examiner*—Joseph Mancuso
*Attorney, Agent, or Firm*—Scully, Scott, Murphy & Presser

[57] ABSTRACT

A single plate compact optical correlator which utilizes a single photographic plate, along with suitable reflectors, wherein the single photographic plate has recorded thereon a multiple holographic lens array, a corresponding multiple matched filter array, and an inverse transform lens.

9 Claims, 2 Drawing Sheets

PROCESSING ELECTRONICS 40

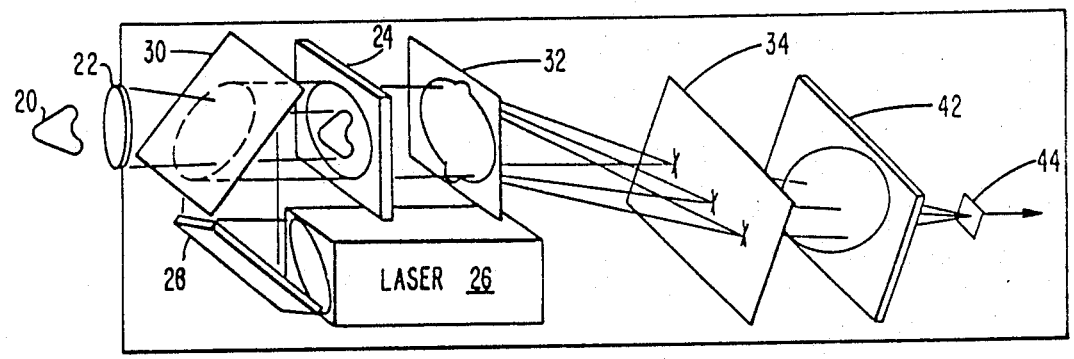
FIG. 3
FIG. 4
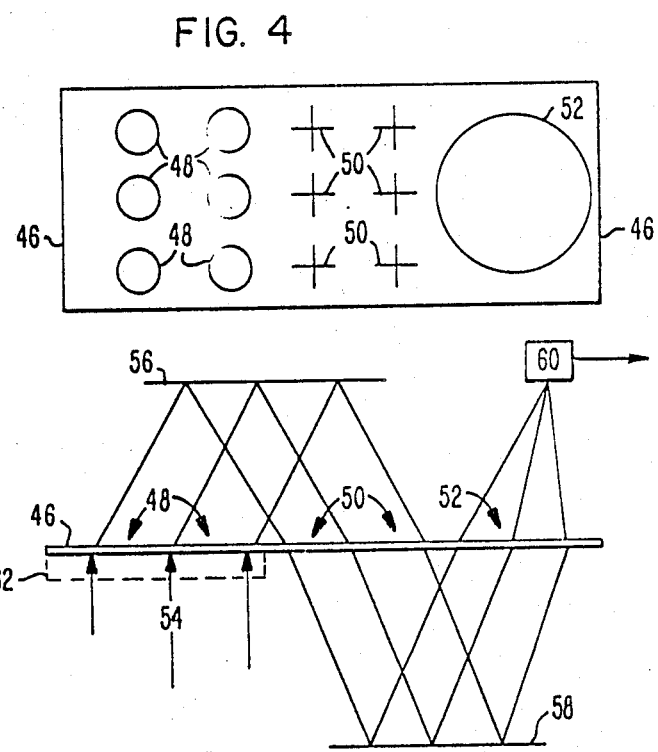
FIG. 5

SINGLE PLATE COMPACT OPTICAL CORRELATOR

BACKGROUND OF THE INVENTION

1. Field of the Invention

The present invention relates generally to a single plate construction compact optical correlator which utilizes a matched filter memory to provide identification and aspect information about an input image.

More particularly, the subject invention relates to a single plate construction compact optical correlator as described in which the construction, fabrication and alignment of several of the critical optical components of the correlator should be simplified.

2. Discussion of the Prior Art

A matched filter optical correlation system is disclosed in U.S. patent application Ser. No. 814,209, filed Dec. 27, 1985. The optical correlation system disclosed therein optically compares an input image with optical information stored in a matched filter or multiple matched filters to provide identification, position, and aspect information about the input image. In one disclosed embodiment, the input image is directed onto a spatial light modulator to spatially modulate a coherent beam of radiation. The spatially modulated radiation beam is directed onto a glass photographic plate having recorded thereon a multiple holographic lens which performs a multiple number of Fourier transformations thereon to obtain an array of a multiple set of Fourier transforms of the spatially modulated radiation beam. A corresponding array of matched filters recorded on a second glass photographic plate has the array of Fourier transforms incident thereon, with each matched filter comprising a Fourier transform hologram of a scale or an aspect view of an object of interest. Each matched filter passes an optical correlation signal in dependence upon the degree of correlation of the Fourier transform of the spatially modulated radiation beam with the Fourier transform hologram recorded thereon. An inverse Fourier transform lens receives the optical correlation outputs of the array of matched filters, and performs an inverse Fourier transformation thereon. A detector detects the inverse Fourier transforms of the optical correlation outputs, and produces a detector output signal representative thereof.

One problem with this type of optical correlator is that of obtaining a proper and precise positional alignment and mounting of the glass plate having the multiple holographic lenses recorded thereon with respect to the glass plate having the multiple matched filter recorded thereon. Each holographic lens should be precisely aligned with respect to its corresponding matched filter with a typical tolerance of less than one micron.

Moreover, the alignment and mounting problems are such that the second glass plate having the multiple matched filters recorded thereon is normally used only in combination with the multiple holographic lens glass plate which was used for its fabrication and recording. In view thereof, as a practical matter, a multiple matched filter plate is normally paired with the multiple holographic lens plate which was used for its fabrication and recording, and the pair of glass plates are maintained and used together.

Another problem with this type of optical correlator is that of maintaining the precisely mounted and aligned optical components stably in position, free of extraneous movements and vibrations, particularly during usage and operation of the optical correlator. Accordingly, the optical correlator is frequently mounted and operated on a stable optical bench or table to isolate it from any extraneous vibrations and to maintain the stability and alignment of its rather precise optical components.

A further problem with this type of optical correlator is that of maintaining the precisely mounted and aligned optical components in a temperature stabilized environment such that thermal gradients do not destabilize the optical correlator.

An additional problem with this type of optical correlator is the generally large size of the overall correlator arrangement which is normally spread across the top of a stabilized optical bench or table, with the large size generally inhibiting practical applications of the correlator.

SUMMARY OF THE INVENTION

Accordingly, it is a primary object of the present invention to provide an optical correlator of the type discussed hereinabove which is more compact than prior art correlators, thus making the maintenance of the stability thereof less of a problem.

An additional object of the subject invention is the provision of a compact optical correlator as described wherein several of the critical optical components thereof which must be maintained in alignment are fabricated on a single optical element.

A further object of the subject invention is the provision of a compact optical system for an optical correlator as described wherein several of the critical components thereof, including primarily the holographic lens(es) and the matched filter(s), and also possibly the inverse Fourier lens(es) are recorded on a single photographic plate. This arrangement results in several significant advantages: a compact optical system wherein alignment problems are minimized; vibrational and temperature stabilization problems are minimized; the multiple matched filters and multiple holographic lenses are recorded on a single photographic plate and are thus always maintained together, and the single photographic plate can be easily and conveniently used as a master to replicate duplicate photographic plates if desired. Moreover, a spatial light modulator of the optical correlator can also be fixedly mounted to the single photographic plate, thus enhancing even further the overall stability of the optical correlator.

In accordance with the teachings herein, the present invention provides a compact system for an optical correlator which optically compares an input image with optical information stored in a matched filter memory to provide identification and aspect information about the input image. In such an optical correlator, a reference beam of radiation is spatially modulated with an input image to be analyzed. A unitary optical plate has recorded thereon at least one holographic lens, which has the spatially modulated radiation beam incident thereon, to produce at least one Fourier transform of the spatially modulated radiation beam. The unitary optical plate also has recorded thereon at least one matched filter which has the Fourier transform incident thereon. The matched filter passes an optical correlation signal in dependence upon the degree of correlation of the Fourier transform of the spatially modulated radiation beam with the Fourier transform recorded by the matched filter. The unitary optical plate additionally has recorded thereon at least one inverse Fourier transform lens which receives the optical correlation output of each matched filter, and performs an inverse Fourier transformation thereon. At least one detector detects the output of the Fourier transform lens and produces a detector output signal representative thereof.

In greater detail, the unitary optical plate comprises a single elongated photographic plate having the holographic lens(es) recorded on a first area at one end thereof, the matched filter(s) recorded on a second central area thereof, and the Fourier transform lens(es) recorded on a third area near the second end of the plate. A first reflector is mounted adjacent to and on one side of the unitary optical plate for reflecting the Fourier transform output(s) of the holographic lens(es) back towards the unitary optical plate onto the matched filter(s). A second reflector is mounted adjacent to and on the opposite side of the unitary optical plate for reflecting the optical correlation signal(s) of the matched filter(s) back towards the inverse Fourier transform lens(es). In a preferred embodiment, the unitary optical plate has recorded thereon a multiple number of holographic lenses, and a corresponding multiple array of matched filters, each of which is addressed by the output of one holographic lens. The inverse Fourier transform lens may comprise one or more lenses depending upon the number of different types of object images recorded in the multiple matched filters.

The unitary optical plate is preferably one single optical plate. However, a plurality of different optical plates, each having one optical component recorded thereon, could also be assembled together, as by a suitable adhesive holding them to a substrate to form the unitary optical plate.

BRIEF DESCRIPTION OF THE DRAWINGS

The foregoing objects and advantages of the present invention for a single plate compact optical correlator may be more readily understood by one skilled in the art with reference being had to the following detailed description of a preferred embodiment thereof, taken in conjunction with the accompanying drawings wherein like elements are designated by identical reference numerals throughout the several views, and in which:

FIG. 3 illustrates a second exemplary embodiment of an optical correlator similar to FIG. 2, in a second common arrangement for such an optical correlator;

FIG. 4 illustrates a single photographic plate having recorded thereon an array of multiple holographic lenses, a corresponding array of multiple matched filters, and a single inverse Fourier transform lens; and FIG. 5 illustrates the single photographic plate of FIG. 4 mounted in a compact optical correlator pursuant to the teachings of the present invention.

DETAILED DESCRIPTION OF THE DRAWINGS

A number of elements and concepts relating to the present invention are used in this description and are essential to an understanding of the functioning and general principles of operation of an optical correlator, and accordingly several of those concepts are discussed initially hereinbelow for convenience.

A holographic lens (HL) is made by recording an interference pattern of an expanding point radiation source and a collimated radiation beam, which produces a hologram of a point source. When the holographic lens (after recording and processing, as on a photographic film plate) is illuminated, it recreates the point source, i.e., it functions as a lens. If the recording process is repeated, a series of point source holograms, or a multiple holographic lens (MHL), is recorded on the film.

An optical correlator as described herein utilizes one of several possible distributions in offset angle, position and focal length in a multiple holographic lens array to produce an array of Fourier transforms of an input spatially modulated, laser radiation beam. In general, the particular requirements of the array will be determined by the particular application being addressed. In summary, a holographic lens takes a Fourier transform of a spatially modulated laser beam of an illuminated scene or target, and a multiple holographic lens takes, simultaneously, a multiple set of Fourier transforms. A multiple holographic lens array is normally used in conjunction with a corresponding array of multiple matched filters. In actual practice, an array of multiple matched filters must be so precisely aligned with a corresponding array of holographic lenses that the array of holographic lenses used to fabricate and record the array of multiple matched filters is used and paired with the array of multiple matched filters during operation of the optical correlator.

Figure 1:
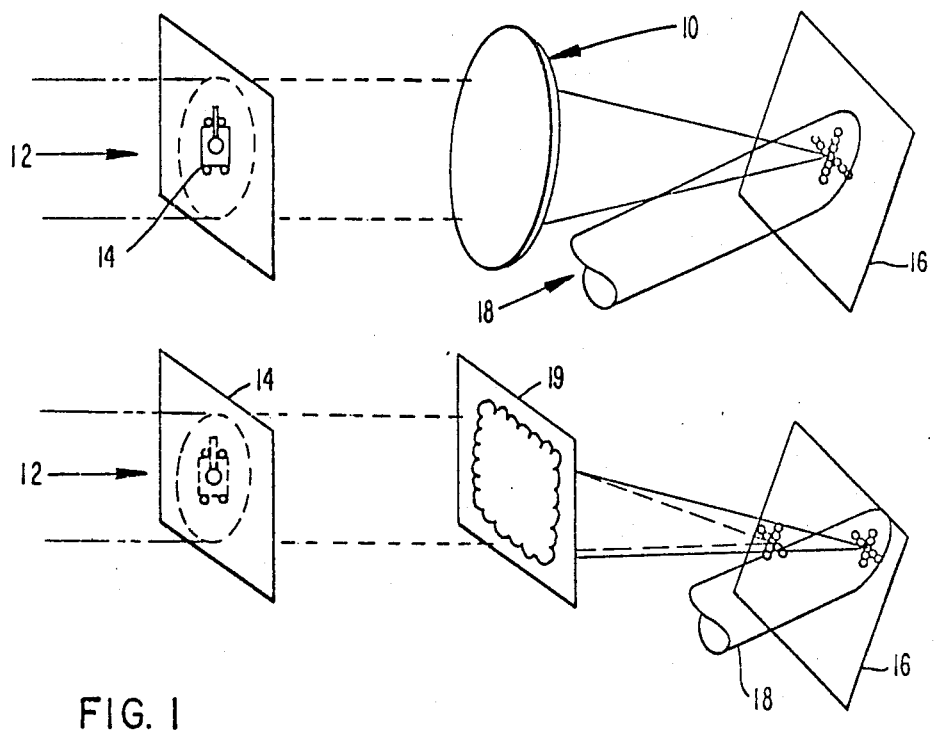
FIG. 1 illustrates in the upper portion thereof a lens forming the Fourier transform of an incident image and the fabrication of a matched filter therefrom with a reference beam, and in the lower portion thereof a multiple holographic lens forming multiple Fourier transforms of an incident image and the fabrication of a multiple matched filter therefrom with a reference beam.

Referring to FIG. 1, when a lens 10 is illuminated by a spatially modulated collimated beam 12, (as when it is modulated spatially by passing through a recorded image 14 of a scene, target, etc.,), the lens creates at its focal point a Fourier transform of the image, which can be recorded on a photographic film plate 16, which is a basic lens property. When the Fourier transform is interfered with a collimated (or reference) beam 18 from the same coherent source, an interference pattern results. This is called a Fourier transform hologram, or Matched Filter (MF), which is an optical spatial filter of the input object. When an arbitrary scene is later played through an optical correlator system employing that matched filter, the matched filter picks out and passes the object information for which it was made. The signal passed by the filter is Fourier transformed again, and the optical correlation signal is detected. If the matched filter target is present, a sharp, strong correlation signal results, whereas non-target signals result in broad low base correlation signals.

Referring specifically to the lower portion of FIG. 1, when an array of multiple holographic lenses 19 is illuminated by a spatially modulated laser beam, the array of MHL 19 forms in the focal planes thereof an array of Fourier transforms of the object. A collimated reference beam 18 can be interfered therewith to form an array of Fourier transform holograms or matched filters which can be recorded on a matched filter plate or film 16. The MHL replicates the Fourier Transform (FT), and so instead of one FT, as many FTs are formed as are present in the MHL array. Before operation, a matched filter (MF) is fabricated at each point corresponding to one of the MHL focal points. This array of MFs constitutes the optical memory of the optical correlator. The MF can be fabricated for many targets, or for many aspects on one target, or for some combination thereof. In operation, all MFs in the array should be precisely aligned to a tolerance typically of less than one micron for proper operation.

Figure 2:
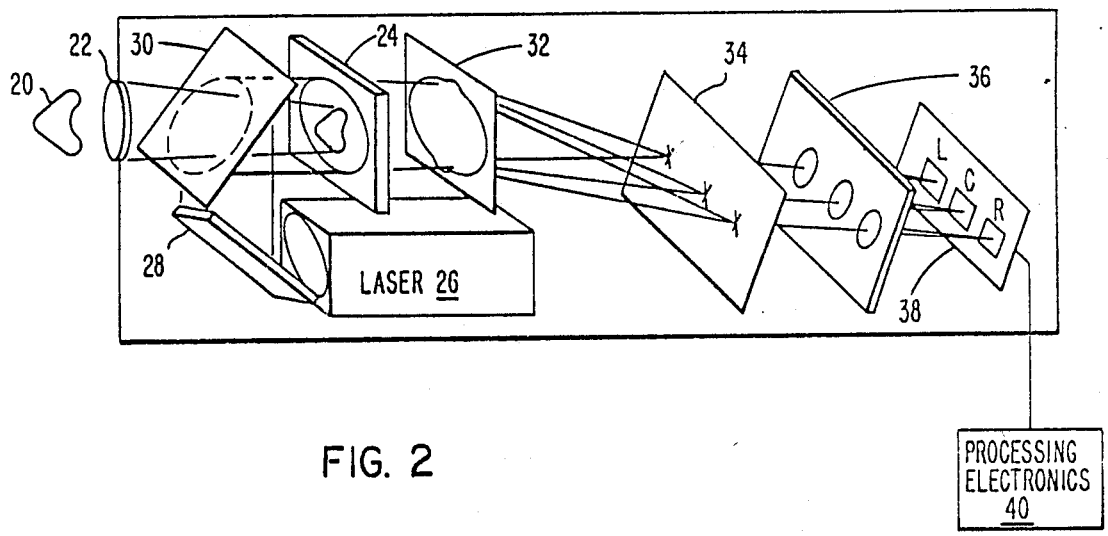
FIG. 2 illustrates a schematic arrangement of one exemplary embodiment of an optical correlator employing a multiple matched filter therein as its memory.

FIG. 2 is a schematic arrangement of a typical optical correlator employing a multiple holographic lens and a multiple matched filter array. The schematic arrangement illustrates a 3×1 multiple holographic lens and a 3×1 multiple matched filter However, it should be realized that any appropriate n×n multiple holographic lens and n×n multiple matched filter could be utilized therein. Referring to FIG. 2, an object of interest 20 is positioned at the input to the optical correlator, and is imaged by an input lens 22 onto a spatial light modulator (SLM) 24, which spatially modulates the image onto a laser beam from a laser 26, directed thereto by a mirror 28 and a beam splitter 30. The spatially modulated laser beam is Fourier transformed by a multiple holographic lens 32 and directed onto a corresponding array of multiple matched filters 34. An inverse Fourier transform lens array 36 inversely Fourier transforms the outputs of the matched filters and directs the outputs thereof onto a detector array 38, the output signals of which can be electronically processed at 40 to produce output control signals.

FIG. 3 illustrates a second optical correlator similar to that of FIG. 2, in a second common arrangement for such an optical correlator in which all of the optical correlation outputs of the multiple matched filters are directed onto a single inverse Fourier transform lens 42, which effectively sums them onto one detector 44 which produces a single detector correlation output signal. As is known in the optical correlation arts, the number of required separate inverse Fourier lenses and detectors depends generally upon the number of different targets stored in the matched filter memory and being processed through the optical correlator.

FIG. 4 illustrates a single photographic plate 46 having recorded thereon a multiple number of holographic lenses shown schematically at 48, and a multiple number of corresponding matched filters shown schematically at 50, and a single Inverse Fourier transform lens shown schematically at 52. The illustrations are stated to be schematic as the individual components do not actually appear as they are shown in FIG. 4, as it would be very difficult and not generally instructive to illustrate their actual appearances. In this embodiment, the unitary optical plate comprises a single elongated photographic plate having the multiple holographic lenses 48 recorded at one end thereof, the corresponding array of matched filters 50 recorded on the central area thereof, and one Fourier transform lens 52 recorded near the second end thereof.

FIG. 5 illustrates the single photographic plate of FIG. 4 mounted in one embodiment of a compact optical correlator pursuant to the teachings of the present invention. A spatially modulated reference beam 54, typically a coherent laser beam, is spatially modulated with an image of interest, as by a spatial light modulator 24, and is directed onto the multiple holographic lenses 48, in a manner similar to the optical correlators of FIGS. 2 and 3. A first reflector 56 is mounted adjacent to and on one side of the unitary optical plate 46, and reflects the Fourier transform outputs of the holographic lenses back towards the unitary optical plate onto the multiple matched filters 50. A second reflector 58 is mounted adjacent to and on the opposite side of the unitary optical plate 46, and reflects the optical correlation signals of the matched filters back towards the inverse Fourier transform lens 52. The outputs of the matched filters are summed by the inverse Fourier transform lens 52 and detected by a single optical detector 60.

In one alternative embodiment, the spatial light modulator 24 might be mounted directly to the photographic plate 46, as shown in dashed lines at 62 in FIG. 5. In other alternative embodiments the photographic plate 46 could be formed by one side of a high optical quality glass cube, as a developed photographic film thereon, with a second opposed surface of the glass cube being mirrored to form the mirror 56. Moreover, with a more complex shape than a cube, a third surface of the more complex solid glass structure could be mirrored to form the mirror 58. The glass in these embodiments should be of high optical quality to minimize optical distortions introduced therefrom.

While several embodiments and variations of the present invention for a single plate compact optical correlator are described in detail herein, it should be apparent that the disclosure and teachings of the present invention will suggest many alternative designs to those skilled in the art.

What is claimed is:

1. A compact system for an optical correlator which optically compares an input image with optical information stored in a matched filter memory to provide identification and aspect information about the input image, comprising:
    a. means for spatially modulating a reference beam of radiation with an input image to be analyzed to produce a spatially modulated radiation beam;
    b. a unitary optical plate having recorded thereon at least one holographic lens, having the spatially modulated radiation beam incident thereon, for performing a Fourier transformation thereon to obtain at least one Fourier transform of the spatially modulated radiation beam, said unitary optical plate also having recorded thereon at least one matched filter, having the Fourier transform incident thereon, with each matched filter comprising a Fourier transform hologram of an aspect view of an object of interest and passing an optical correlation signal in dependence upon the degree of correlation of the Fourier transform of the spatially modulated radiation beam with the Fourier transform recorded by the matched filter;
    c. at least one inverse Fourier transform lens receiving the optical correlation output of each matched filter, for performing an inverse Fourier transformation on each optical correlation output; and
    d. a detector means for detecting the output of the at least one Fourier transform lens and for producing a detector output signal representative thereof.

2. A compact optical system for an optical correlator which optically compares an input image with optical information stored in a matched filter memory to provide identification and aspect information about the input image as claimed in claim 1, wherein said unitary optical plate also has recorded thereon said at least one inverse Fourier transform lens.

3. A compact optical system for an optical correlator which optically compares an input image with optical information stored in a matched filter memory to provide identification and aspect information about the input image as claimed in claim 2, wherein said unitary optical plate comprises a single photographic plate having said at least one holographic lens recorded on a first area thereof, said at least one matched filter recorded on a second area thereof, and said at least one inverse Fourier transform lens recorded on a third area thereof.

4. A compact optical system for an optical correlator which optically compares an input image with optical information stored in a matched filter memory to provide identification and aspect information about the input image as claimed in claim 3, wherein said single photographic plate is an elongated plate having said first area near one end thereof, said second area near the center thereof, and said third area near the second end of the elongated plate.

5. A compact optical system for an optical correlator which optically compares an input image with optical information stored in a matched filter memory to provide identification and aspect information about the input image as claimed in claim 4, further including a first reflector means mounted adjacent to and on one side of said unitary optical plate for reflecting the Fourier transform output of said at least one holographic lens back towards said unitary optical plate onto said at least one matched filter, and a second reflector means mounted adjacent to and on an opposite side of said unitary optical plate for reflecting the optical correlation signal of said at least one matched filter back towards said at least one inverse Fourier transform lens.

6. A compact optical system for an optical correlator which optically compares an input image with optical information stored in a matched filter memory to provide identification and aspect information about the input image as claimed in claim 5, said unitary optical plate having recorded thereon a multiple number of holographic lenses on said first area, and an array of matched filters on said second area, each of which is addressed by the output of one holographic lens.

7. A compact optical system for an optical correlator which optically compares an input image with optical information stored in a matched filter memory to provide identification and aspect information about the input image as claimed in claim 2, further including a first reflector means mounted adjacent to and on one side of said unitary optical plate for reflecting the Fourier transform output of said at least one holographic lens back towards said unitary optical plate onto said at least one matched filter, and a second reflector means mounted adjacent to an on an opposite side of said unitary optical plate for reflecting the optical correlation signal of said at least one matched filter back towards said at least one inverse Fourier transform lens.

8. A compact optical system for an optical correlator which optically compares an input image with optical information stored in a matched filter memory to provide identification and aspect information about the input image as claimed in claim 1, said unitary optical plate having recorded thereon a multiple number of holographic lenses on said first area, and an array of matched filters on said second area, each of which is addressed by the output of one holographic lens.

9. A compact optical system for an optical correlator which optically compares an input image with optical information stored in a matched filter memory to provide identification and aspect information about the input image as claimed in claim 1, wherein said unitary optical plate comprises a single photographic plate having said at least one holographic lens recorded on a first area thereof, said at least one matched filter recorded on a second area thereof, and said at least one inverse Fourier transform lens recorded on a third area thereof.

* * * * *